US011942008B2

United States Patent
Li et al.

(10) Patent No.: US 11,942,008 B2
(45) Date of Patent: Mar. 26, 2024

(54) SMART TRACKING-BASED PROJECTION METHOD AND SYSTEM

(71) Applicant: IVIEW DISPLAYS (SHENZHEN) COMPANY LTD., Shenzhen (CN)

(72) Inventors: Xiang Li, Shenzhen (CN); Wenxiang Li, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 121 days.

(21) Appl. No.: 17/543,943

(22) Filed: Dec. 7, 2021

(65) Prior Publication Data

US 2022/0208038 A1     Jun. 30, 2022

Related U.S. Application Data

(63) Continuation of application No. PCT/CN2021/082412, filed on Mar. 23, 2021.

(30) Foreign Application Priority Data

Dec. 29, 2020   (CN) .......................... 202011592014.9

(51) Int. Cl.
    *H04N 9/31*         (2006.01)
    *G06T 7/20*          (2017.01)
    (Continued)

(52) U.S. Cl.
    CPC ............... *G09G 3/002* (2013.01); *G06T 7/20* (2013.01); *G06T 7/70* (2017.01); *G06T 17/00* (2013.01);
    (Continued)

(58) Field of Classification Search
    CPC .......... G09G 3/002; G09G 2340/0492; G09G 2340/125; G09G 2360/16; G06T 7/20;
    (Continued)

(56) References Cited

U.S. PATENT DOCUMENTS

| 2009/0138233 | A1* | 5/2009 | Kludas | .................. | G06T 3/4038 |
| | | | | | 702/158 |
| 2019/0251699 | A1* | 8/2019 | Chih | ...................... | G06V 20/10 |

(Continued)

FOREIGN PATENT DOCUMENTS

| CN | 105589293 A | 5/2016 |
| CN | 206575538 U | 10/2017 |

(Continued)

*Primary Examiner* — Adam R. Giesy
(74) *Attorney, Agent, or Firm* — IPRO, PLLC

(57) ABSTRACT

Embodiments of the present disclosure relate to a smart tracking-based projection method and system. The method includes: acquiring information of a real space of a spatial information capturing unit, constructing a 3D model of the real space, and acquiring first position information of a projection picture; acquiring target image information of a target tracking unit, and acquiring second position information of a tracking target based on the target image information; acquiring a target projection region based on the 3D model and the second position information; acquiring, based on the target projection region, rotation information desired by the projection unit; and controlling, based on the rotation information, a drive unit to operate such that the projection picture reaches the target projection region.

10 Claims, 6 Drawing Sheets

(51) Int. Cl.
 *G06T 7/70* (2017.01)
 *G06T 17/00* (2006.01)
 *G09G 3/00* (2006.01)
(52) U.S. Cl.
 CPC ........... *H04N 9/317* (2013.01); *H04N 9/3185* (2013.01); *G09G 2340/0492* (2013.01)
(58) Field of Classification Search
 CPC ........... G06T 7/70; G06T 17/00; H04N 9/317; H04N 9/3185; H04N 9/3194
 See application file for complete search history.

(56) References Cited

U.S. PATENT DOCUMENTS

| | | | |
|---|---|---|---|
| 2019/0279373 A1 | 9/2019 | Boss et al. | |
| 2019/0371053 A1* | 12/2019 | Engholm | G06T 17/05 |
| 2020/0143558 A1 | 5/2020 | Tran | |

FOREIGN PATENT DOCUMENTS

| | | |
|---|---|---|
| CN | 109996051 U | 7/2019 |
| CN | 110769214 A | 2/2020 |
| CN | 110930518 A | 3/2020 |
| CN | 111031298 A | 4/2020 |
| CN | 210491076 U | 5/2020 |
| IN | 108513117 A | 9/2018 |
| WO | 2016145079 A | 9/2016 |

\* cited by examiner

SMART TRACKING-BASED PROJECTION METHOD AND SYSTEM

CROSS-REFERENCE TO RELATED APPLICATION

This application is based upon and claims priority to Chinese Patent Application No. 202011592014.9, filed before China National Intellectual Property Administration on Dec. 29, 2020 and entitled "SMART TRACKING-BASED PROJECTION METHOD AND SYSTEM," the entire contents of which are incorporated herein by reference.

TECHNICAL FIELD

Embodiments of the present disclosure relate to the technical field of digital projection and display, and in particular, relate to a smart tracking-based projection method and system.

BACKGROUND

With the development of science and technology, and constant enhancement of people's life, people are imposing higher and higher requirements on visual experience. In one aspect, people are desiring multi-view angles, large screen and high resolution with respect to display devices as man-machine interfaces. In another aspect, people are tending to pursue augmented reality and immersive visual experience in terms of display effect, and pursue smartness and convenience in terms of operation.

In practical augmented reality projection, at current, most of projected pictures are originated from static objects, for example, a desk, a wall and the like. Dynamic scenarios are not involved, and no sufficient connection and interaction are made with environments and targets.

SUMMARY

With respect to the above defects in the related art, embodiments of the present disclosure are intended to provide a smart tracking-based projection method and system such that a projection picture moves with a target.

In a first aspect, one technical solution employed by the embodiments of the present disclosure is a smart tracking-based projection method, applicable to a smart tracking-based projection system, the smart tracking-based projection system including a spatial information capturing unit, a target tracking unit, a projection unit, and a drive unit; wherein the method includes: acquiring information of a real space of the spatial information capturing unit, constructing a 3D model of the real space, and acquiring first position information of a projection picture projected by the projection unit; acquiring target image information of the target tracking unit, and acquiring second position information of a tracking target based on the target image information; acquiring a target projection region based on the 3D model and the second position information; acquiring, based on the target projection region, rotation information desired by the projection unit; and controlling, based on the rotation information, the drive unit to operate such that the projection picture reaches the target projection region.

In some embodiments, acquiring the target projection region based on the 3D model and the second position information includes: determining at least one projectable region in the 3D model based on the second position information; grading the at least one projectable region based on the an area of the at least one projectable region and a projection area desired by the projection picture to acquire different grades of projectable regions; acquiring an optimal projectable region based on the different grades of projectable regions; and determining the optimal projectable region as the target projection region.

In some embodiments, acquiring, based on the target projection region, the rotation information desired by the projection unit includes: determining at least one rotation path of the projection picture based on the target projection region and the first position information; grading the at least one rotation path based on a length of the rotation path and a number of unprojectable regions on the rotation path to acquire different grades of rotation paths; acquiring an optimal rotation path based on the different grades of rotation paths; and acquiring, based on the optimal rotation path, rotation information corresponding to the optimal rotation path.

In some embodiments, the rotation information is a rotation angle of the projection unit.

In some embodiments, the method further includes: acquiring an angle variation of the projection picture based on the rotation information; acquiring a correction angle of the projection picture based on the angle variation; and correcting the projection picture based on the correction angle.

In some embodiments, the method further includes: acquiring a stretching variation of the projection picture based on the rotation information; acquiring a stretching correction coefficient of the projection picture based on the stretching variation; and correcting the projection picture based on the stretching correction coefficient.

In some embodiments, the method further includes: performing automatic focusing for the projection unit.

In a second aspect, the embodiments of the present disclosure further provide a smart tracking-based projection system. The smart tracking-based tracking system includes: a spatial information capturing unit, configured to capture information of a real space; a target tracking unit, configured to acquire target information of a tracking target; a projection unit, configured to acquire a projection picture by projection; a drive unit, connected to the projection unit and configured to drive the projection unit to rotate; and a control unit, connected to the spatial information capturing unit, the target tracking unit, the projection unit, and the drive unit; wherein the control unit includes: at least one processor; and a memory communicably connected to the at least one processor; wherein the memory stores one or more instructions executable by the at least one processor, wherein the one or more instructions, when executed by the at least one processor, cause the at least one processor to perform the smart tracking-based projection method according to the first aspect.

In some embodiments, the drive unit includes at least two stepping motors.

In a third aspect, the embodiments of the present disclosure further provide a non-volatile computer-readable storage medium storing one or more computer-executable instructions, wherein the one or more computer-executable instructions, when executed by a processor, cause the processor to perform the smart tracking-based projection method according to the first aspect.

In a fourth aspect, the embodiments of the present disclosure further provide a computer program product. The computer program product includes one or more computer programs stored in a non-volatile computer-readable storage medium, wherein the one or more computer programs include one or more program instructions, which, when executed by a computer, cause the computer to perform the smart tracking-based projection method according to the first aspect.

The embodiments of the present disclosure achieve the following beneficial effect: Different from the related art, the present disclosure provides a smart tracking-based projection method, applicable to a smart tracking-based projection system. The method includes: acquiring information of a real space of a spatial information capturing unit, constructing a 3D model of the real space, and acquiring first position information of a projection picture; acquiring target image information of a target tracking unit, and acquiring second position information of a tracking target based on the target image information; acquiring a target projection region based on the 3D model and the second position information; acquiring, based on the target projection region, rotation information desired by the projection unit; and controlling, based on the rotation information, a drive unit to operate such that the projection picture reaches the target projection region. By the method, a target may be tracked, such that the projection picture reaches the target projection region, and thus motion projection is achieved.

BRIEF DESCRIPTION OF THE DRAWINGS

One or more embodiments are illustrated by way of example, and not by limitation, in the figures of the accompanying drawings, wherein elements/modules and steps having the same reference numeral designations represent like elements/modules and steps throughout. The drawings are not to scale, unless otherwise disclosed.

DETAILED DESCRIPTION

The present disclosure is further described with reference to some exemplary embodiments. The embodiments hereinafter facilitate further understanding of the present disclosure for a person skilled in the art, rather than causing any limitation to the present disclosure. It should be noted that persons of ordinary skill in the art may derive various variations and modifications without departing from the inventive concept of the present disclosure. Such variations and modifications shall pertain to the protection scope of the present disclosure.

For better understanding of the present disclosure, the present disclosure is described in detail with reference to attached drawings and specific embodiments. Unless the context clearly requires otherwise, throughout the specification and the claims, technical and scientific terms used herein denote the meaning as commonly understood by a person skilled in the art. Additionally, the terms used in the specification of the present disclosure are merely for describing the objects of the specific embodiments, and are not intended to limit the present disclosure. As used herein, the term "and/or" in reference to a list of one or more items covers all of the following interpretations of the term: any of the items in the list, all of the items in the list and any combination of the items in the list.

It should be noted that, in the absence of conflict, embodiments of the present disclosure and features in the embodiments may be incorporated, which all fall within the protection scope of the present disclosure. In addition, although function module division is illustrated in the schematic diagrams of apparatuses, and in some occasions, module division different from the divisions of the modules in the apparatuses may be used. Further, the terms "first," "second," and the like used in this text do not limit data and execution sequences, and are intended to distinguish identical items or similar items having substantially the same functions and effects.

Figure 1:
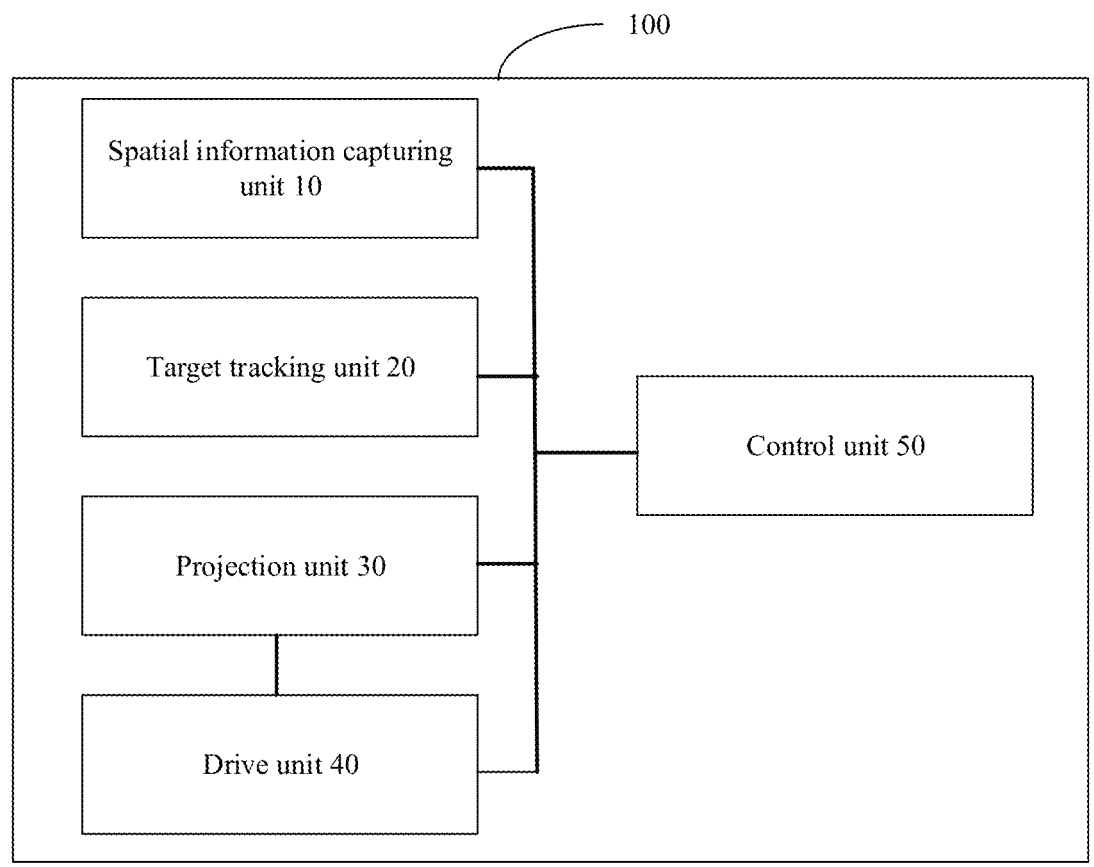
FIG. 1 is a schematic structural block diagram of a smart tracking-based projection system according to an embodiment of the present disclosure.

Referring to FIG. 1, FIG. 1 is a schematic structural block diagram of a smart tracking-based projection system 100 according to an embodiment of the present disclosure. As illustrated in FIG. 1, the smart tracking-based projection system 100 includes: a spatial information capturing unit 10, a target tracking unit 20, a projection unit 30, a drive unit 40, and a control unit 50. The control unit 50 is connected to the spatial information capturing unit 10, the target tracking unit 20, the projection unit 30, and the drive unit 40.

The spatial information capturing unit 10 is configured to capture information of a real space. In some embodiments, the spatial information capturing unit 10 includes an image capturing module and a ranging module. The image capturing module is configured to capture image data in a real space. The ranging module is configured to capture distance and azimuth data. The image data and the distance and azimuth data constitute information of the real space. The spatial information capturing unit 10 sends the information to the control unit 50. In this way, the control unit 50 is capable of constructing a panorama image carrying the distance and azimuth information, such that the control unit 50 constructs a 3D model of the real space. In practice, the spatial information capturing unit 10 may be configured as any other suitable information capturing modules, which is not limited to the description in this embodiment.

The target tracking unit 20 is configured to acquire target image information of a tracking target. In some embodiments, the target tracking unit 20 may be a 3D camera, a microwave radar, or the like. In addition, the target tracking unit 20 has a greater detection range, with detection angles in horizontal and vertical directions both exceeding 90 degrees, even approximating 180 degrees. Therefore, the target tracking unit 20 may be employed to acquire the target image information of the tracking target, and send the target image information to the control unit 50, such that the control unit 50 detects presence of the tracking target and acquires position information of the tracking target based on the target image information. In practice, the target tracking unit 20 may be any other suitable sensors having a depth perception capability.

The projection unit 30 is configured to acquire a projection picture by projection. Specifically, the projection unit 30 may be a long-focus projector optical engine. The long-focus projector optical engine is capable of ensuring projection of a projection screen to a distant position, and ensuring an appropriate screen and brightness. In practice, the projecting unit 30 may be any other suitable devices of having a projection function.

The drive unit 40 is connected to the projection unit 30. The drive unit 40 is configured to drive the projection unit 30 to rotate. In some embodiments, the drive unit 40 includes at least two motors, which are capable of driving the projection unit 30 to rotate on the spot by 360 degrees, such that light emitted from the projection unit 30 is capable of rotating by 360 degrees with the projection unit 30 as a center. Specifically, to more accurately acquire a rotation angle of the drive unit 40, the drive unit 40 further includes at least two rotation shafts and at least two encoders. Each of the motors is connected to the rotation shaft and the encoder. The rotation shaft is configured to drive the motor to rotate. The encoder is configured to record a rotation position of the motor. The motor may be a stepping motor or a servo motor. In practice, the drive unit 40 may be any type of devices capable of rotating in horizontal and vertical directions. For example, the drive unit 40 may also be a pan-tilt-zoom camera or a multi-dimensional motion platform.

The control unit 50 is configured to control the spatial information capturing unit 10, the target tracking unit 20, the projection unit 30, and the drive unit 40 to operate, and process data to acquire a result. The control unit 50 includes: at least one processor, and a memory communicably connected to the at least one processor; wherein the memory stores one or more instructions executable by the at least one processor, wherein the one or more instructions, when executed by the at least one processor, cause the at least one processor to perform the smart tracking-based projection method according to any embodiment hereinafter.

Figure 2:
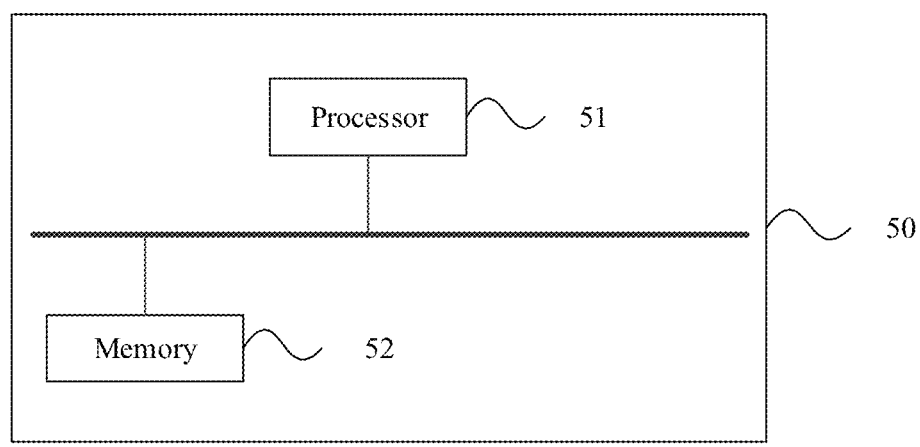
FIG. 2 is a schematic hardware structural diagram of a control unit according to an embodiment of the present disclosure.

As illustrated in FIG. 2, the control unit 50 includes at least one processor 51, and a memory 52 communicably connected to the at least one processor 51. FIG. 2 uses one processor 51 as an example.

The processor 51 and the memory 52 may be connected via a bus or in another manner, and FIG. 2 uses the bus as an example.

The memory 52, as a non-volatile computer readable storage medium, may be used to store non-volatile software programs, and non-volatile computer executable programs and modules. The non-volatile software programs, instructions and modules stored in the memory 52, when executed, cause the processor 51 to perform various function applications and data processing of the control apparatus, that is, performing the smart tracking-based projection method according to any method embodiment hereinafter.

The memory 52 may include a program memory area and data memory area, wherein the program memory area may store operating systems and application programs needed by at least function; and the data memory area may store data created according to the usage of the smart tracking-based projection system. In addition, the memory 52 may include a high-speed random access memory, or include a non-volatile memory, for example, at least one disk storage device, a flash memory device, or another non-volatile solid storage device. In some embodiments, the memory 52 optionally includes memories remotely configured relative to the processor 51. These memories may be connected to the processor over a network. Examples of the above network include, but not limited to, the Internet, Intranet, local area network, mobile communication network and a combination thereof.

In some other embodiments, the smart tracking-based projection system 100 further includes a correction unit. The correction unit may be any suitable devices having a correction function. The correction unit is connected to the projection unit 30 and the control unit 50. The correction unit is configured to correct a projection picture, for example, angle correction and stretching correction, such that the projection picture remains clear.

In some other embodiments, the smart tracking-based projection system 100 further includes a projection lens and a focusing unit. The projection lens is connected to the focusing unit, and the focusing unit is connected to the control unit 50. The control unit 50 controls the focusing unit to move the projection lens to a focusing position, such that automatic focusing is achieved.

The smart tracking-based projection system according to the present disclosure is applicable to more scenarios. For example, the system may be applicable to security, commerce, entertainment, and the like scenarios.

Figure 3:
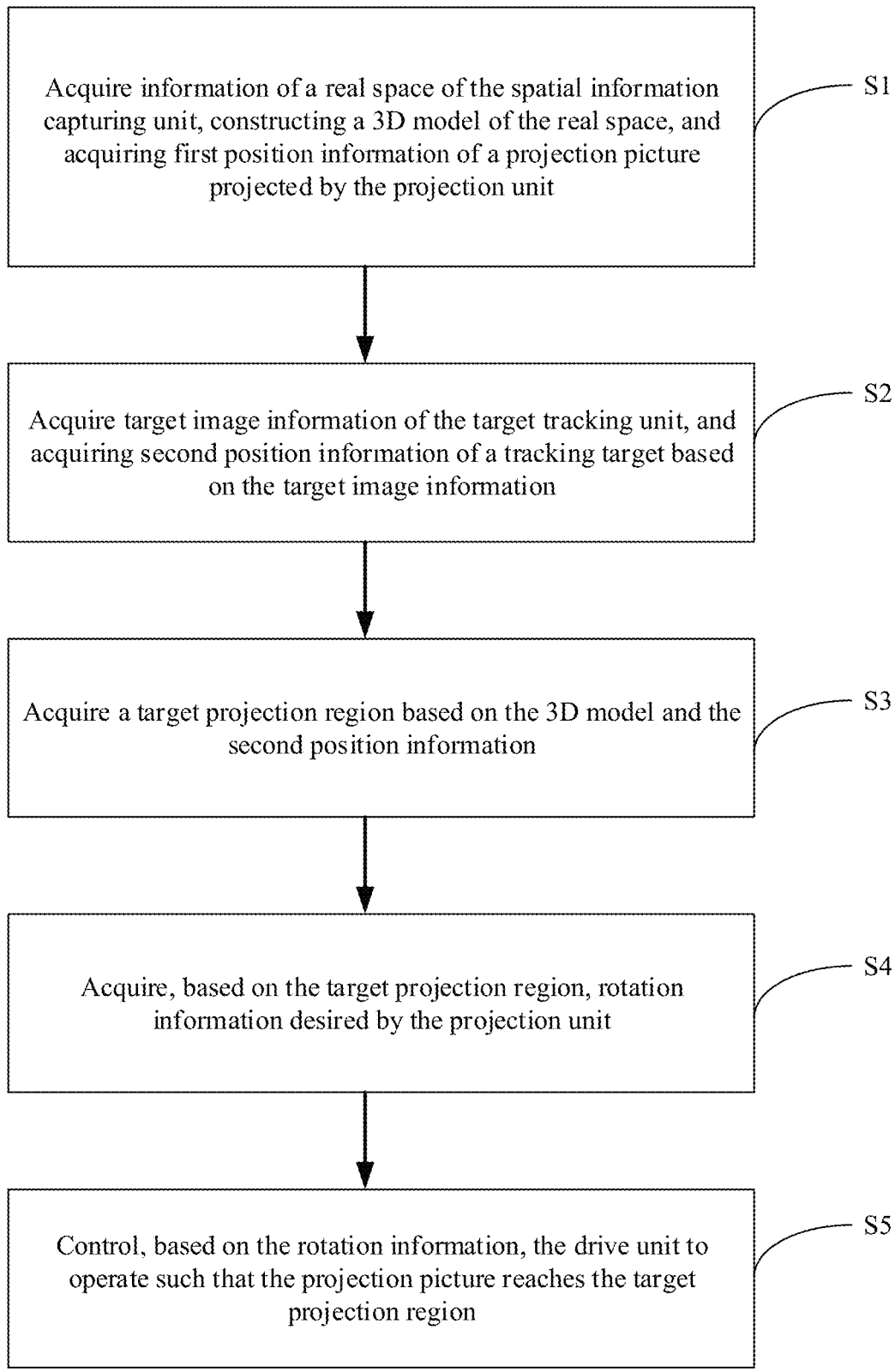
FIG. 3 is a schematic flowchart of a smart tracking-based projection method according to an embodiment of the present disclosure.

Hereinafter, a smart tracking-based projection method according to the embodiments of the present disclosure is described in detail with reference to the accompanying drawings. Referring to FIG. 3, FIG. 3 is a schematic flowchart of a smart tracking-based projection method according to an embodiment of the present disclosure. The smart tracking-based projection method may be performed by the control unit as illustrated in FIG. 1. The smart tracking-based projection method includes the flowing steps.

In step S1, information of a real space of the spatial information capturing unit is acquired, a 3D model of the real space is constructed, and first position information of a projection picture projected by the projection unit is acquired.

Specifically, the information of the real space includes image information of the projection picture projected by the projection unit. Therefore, during construction of the 3D model, the first position information of the projection picture may be acquired based on the image information. Further, a three-dimensional coordinate system may be pre-established in the 3D model, and during determination of the first position information, first three-dimensional coordinates of the projection picture in the three-dimensional coordinate system may be calculated by using a center point of the projection picture.

It may be understood that the 3D model of the real space is a mapping to the real space, and all objects actually present in the real space and characteristic parameters of all these objects, for example, lengths, widths and heights, three-dimensional coordinates, spacings and the like of the objects, may be acquired from the 3D model. Theoretically, the real space may be designed as infinite. In practice, information of the real space may be captured based on a real space region selected by a user. Generally, the real space region selected by the user shall include a projection picture of the projection unit and a region where a tracking target is positioned. For more accurate smart tracking-based projection, in some other embodiments, the real space region shall further include a region where the projection unit is positioned.

In step S2, target image information of a target tracking unit is acquired, and second position information of a tracking target is acquired based on the target image information.

Specifically, based on the target image information acquired by the target tracking unit, the tracking target matching the target image information is found in the 3D model, and second three-dimensional coordinates of the tracking target in the three-dimensional coordinate system are acquired from the three-dimensional coordinate system pre-established in the 3D model. In this way, the second position information of the tracking target is acquired.

It may be understood that the tracking target may be a person, an animal, or any other moving object, and interaction projection may be achieved between the projection picture and the tracking target, or augmented reality projection may be achieved for the projection picture in combination with the tracking object.

In step S3, a target projection region is acquired based on the 3D model and the second position information.

It is necessary to determine the target projection region such that the projection picture is capable of moving with the motion of the tracking target. For example, a projectable region in the vicinity of the tracking target is determined based on the 3D model and the second position information of the tracking target, such that the target projection region is acquired.

Figure 4:
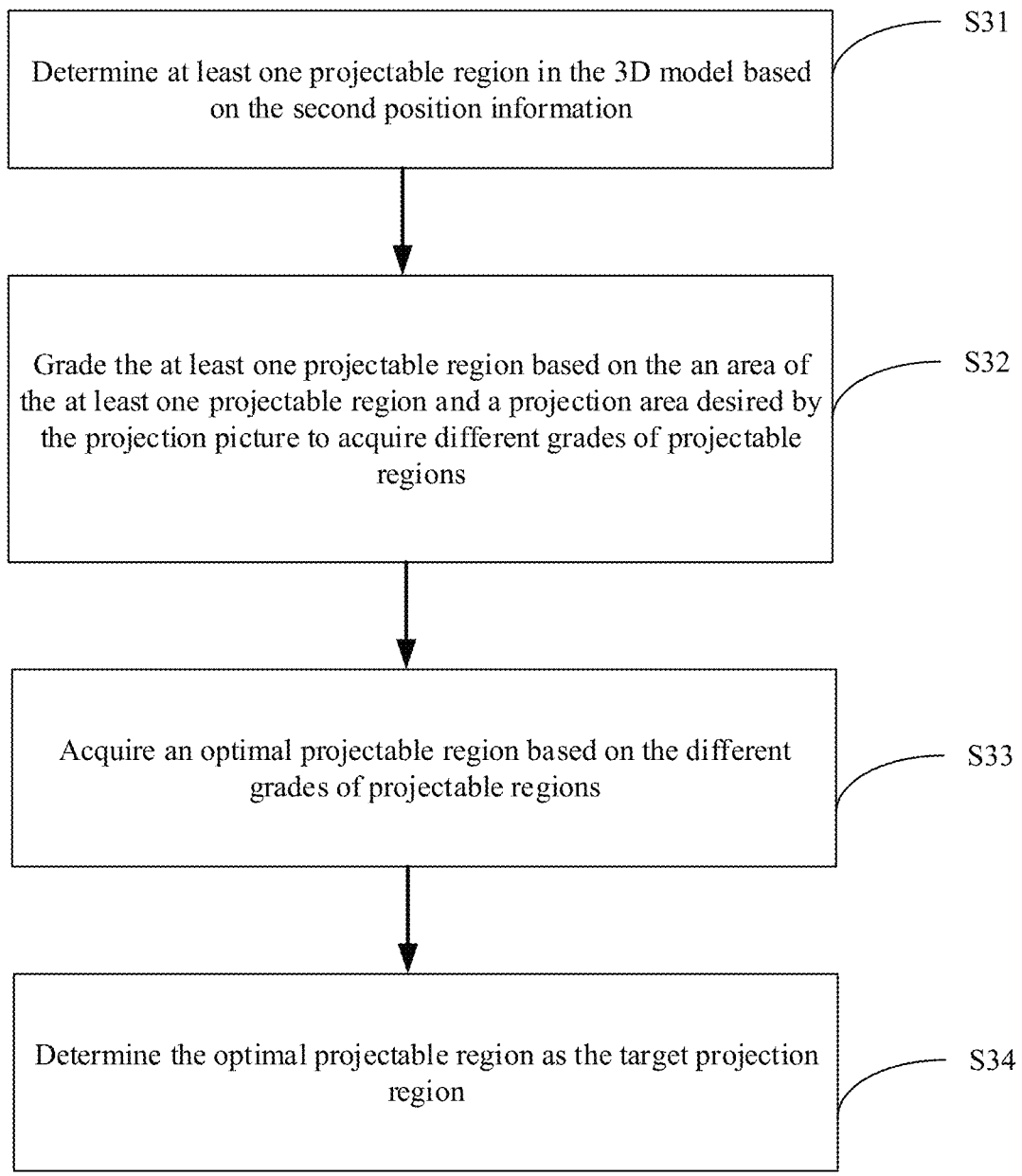
FIG. 4 is schematic flowchart of step S3 in FIG. 3.

Specifically, referring to FIG. 4, step S3 further includes the following sub-steps.

In sub-step S31, at least one projectable region in the 3D model is determined based on the second position information.

In sub-step S32, the at least one projectable region is graded based on the an area of the at least one projectable region and a projection area desired by the projection picture to acquire different grades of projectable regions.

In sub-step S33, an optimal projectable region is acquired based on the different grades of projectable regions.

In sub-step S34, the optimal projectable region is determined as the target projection region.

Specifically, the projectable region in the vicinity of the tracking target is detected based on the second position information of the tracking target, and subsequently, an area of the projectable region is calculated. Afterwards, the projectable region is graded based on the area of the projectable region and a predetermined projection area of the projection picture, and it is determined that the projectable region has a superior grade in the case that the area of the projectable region approaches the predetermined projection area. Finally, the projection region having a superior grade is selected as the target projection region. In this way, the target projection region optimally matches the predetermined projection area of the projection picture, which is favorable to completely presenting the projection picture.

In some other embodiments, in the case that the projection picture of the projection unit is a three-dimensional picture, the projectable region is graded, and the grading may be performed based on a volume of the projection region and a predetermined projection volume of the projection picture, such that the target projection region is acquired.

For improvement of user experience, in some other embodiments, during acquisition of the projectable region, the projectable region may also be determined based on a visual extent of the user or the tracking target. The projection region within the visual extent of the user or the tracking target is only determined as the projectable region, and then the projectable region is graded, such that the target projection region is acquired. It may be understood that the projectable region may also be graded based on the visual extent of the user or the tracking target. For example, the greater the area/volume of the projectable region within the visual extent of the user or the tracking target, the more superior the grade. In practice, the process of selecting the target projection region may be designed according to the actual needs, which is not limited to the description in the embodiments of the present disclosure.

In step S4, rotation information desired by the projection unit is acquired based on the target projection region.

Compared with acquisition of the first three-dimensional coordinates corresponding to the first position information of the projection picture, in this case, in the three-dimensional coordinate system pre-established in the 3D model, target three-dimensional coordinates of the target projection region in the three-dimensional coordinate system are calculated by using a center point of the target projection region. Then, at least one rotation path of the projection picture may be determined based on the first three-dimensional coordinates and the target three-dimensional coordinates, such that the rotation information desired by the projection unit is acquired.

Figure 5:
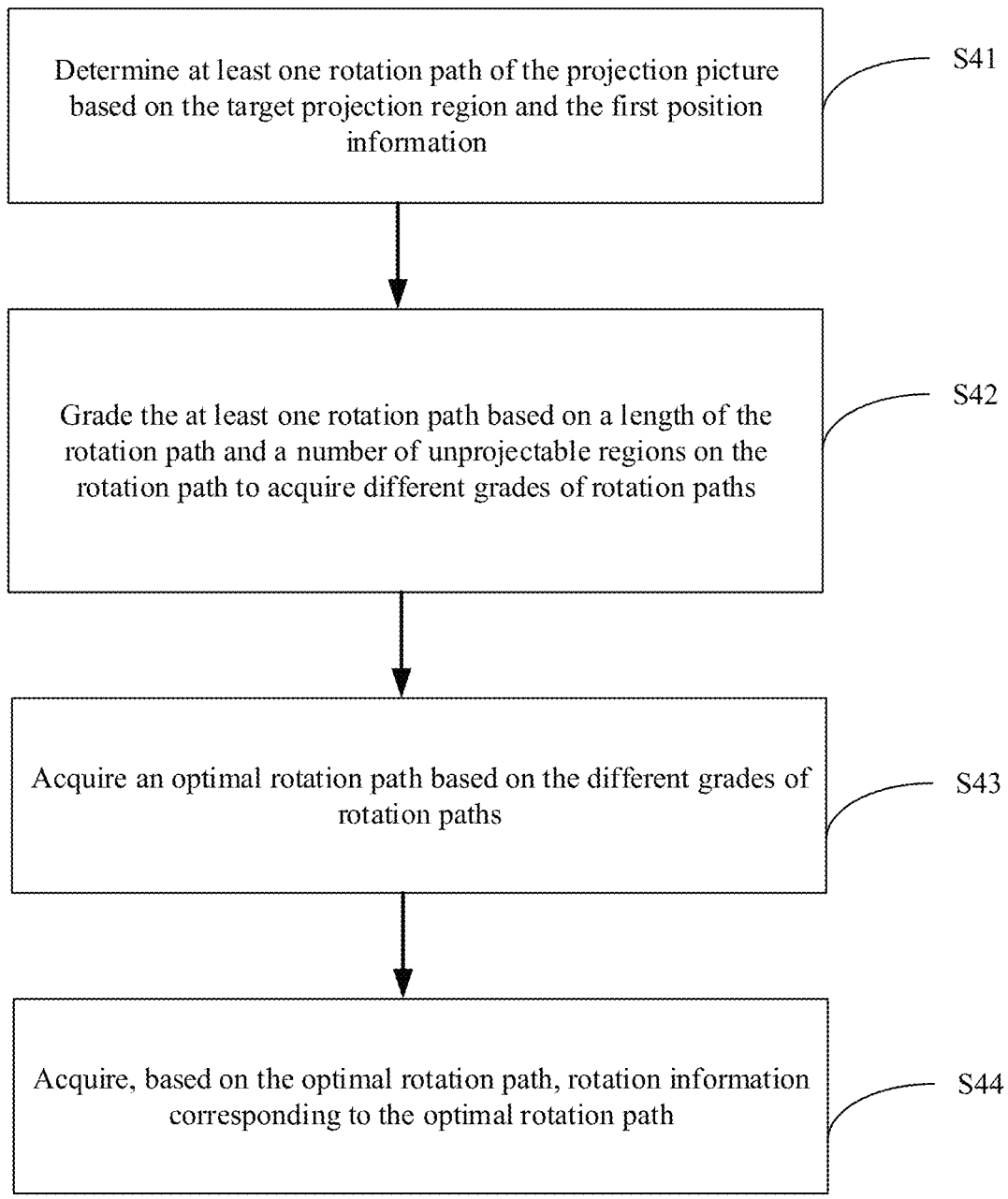
FIG. 5 is schematic flowchart of step S4 in FIG. 3.

In order that the projection picture constantly remains clear and visible on the rotation path and is not subject to interference caused by an obstacle, for example, an unprojectable region, on the rotation path during rotation of the projection picture with the motion of the tracking target, in the case that the rotation path of the projection picture is acquired, it is necessary to optimize the rotation path of the projection picture, that is, optimized selection of the rotation information of the projection unit, to ensure that the projection picture may be completely presented to the user or the tracking target during rotation of the projection unit. Specifically, referring to FIG. 5, step S4 further includes the following sub-steps.

In sub-step S41, at least one rotation path of the projection picture is determined based on the target projection region and the first position information.

In sub-step S42, the at least one rotation path is graded based on a length of the rotation path and a number of unprojectable regions on the rotation path to acquire different grades of rotation paths.

In sub-step S43, an optimal rotation path is acquired based on the different grades of rotation paths.

In sub-step S44, rotation information corresponding to the optimal rotation path is acquired based on the optimal rotation path.

The rotation path of the projection picture is graded. The less the length of the rotation path and the less the number of unprojectable regions on the rotation path, the more superior of the grade of the rotation path. In this way, the rotation information corresponding to the optimal rotation path is acquired, such that it is ensured that the projection picture is completely presented to the user or the tracking target during rotation.

In step S5, the drive unit is controlled, based on the rotation information, to operate such that the projection picture reaches the target projection region.

Specifically, the rotation information is a rotation angle of the projection unit. The drive unit is controlled, based on the rotation angle, to operate to drive the projection unit to rotate by the rotation angle. In this way, the projection picture is rotated on the optimal rotation path, and finally reaches the target projection region, thereby implementing smart tracking-based projection.

By the smart tracking-based projection method according to the embodiments of the present disclosure, the projection picture is controlled, based on the motion of the tracking target, to move to the target projection region, such that motion projection is achieved.

Figure 6:
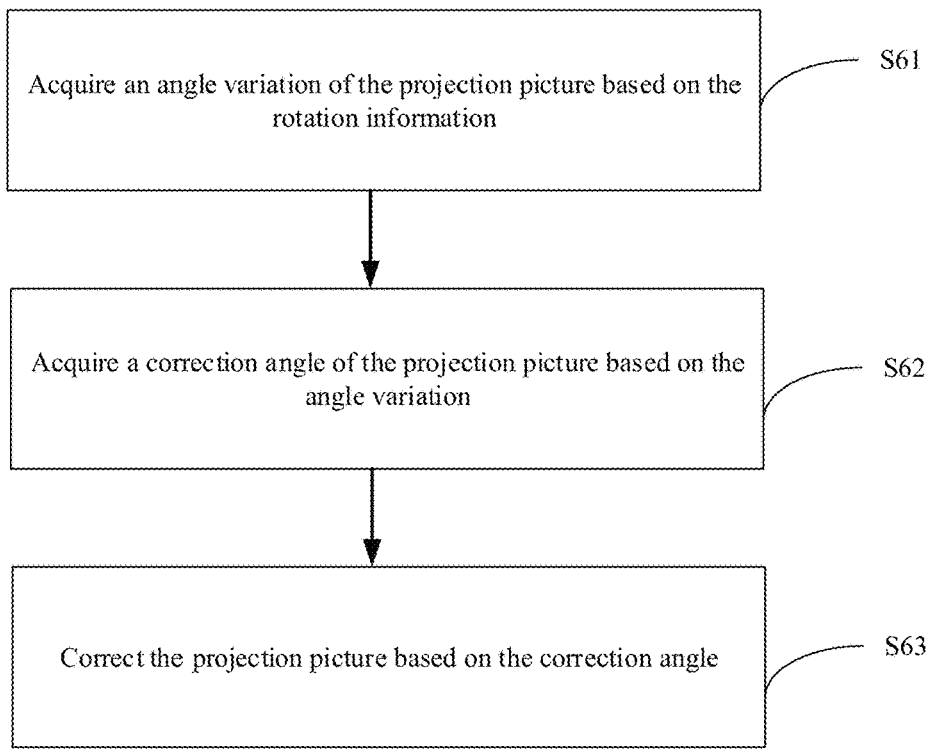
FIG. 6 is a schematic flowchart of correcting a projection picture according to an embodiment of the present disclosure.

For correction of angle inclination occurred to the projection picture during rotation, in some embodiments, referring to FIG. 6, in the case that the projection picture reaches the target projection region, the method further includes the following steps.

In step S61, an angle variation of the projection picture is acquired based on the rotation information.

In step S62, a correction angle of the projection picture is acquired based on the angle variation.

In step S63, the projection picture is corrected based on the correction angle.

Specifically, the rotation angle of the projection picture is acquired based on the rotation information, and the correction angle of the projection picture is generated. The rotation angle includes a magnitude of the rotation angle and a direction of the rotation angle, and the correction angle includes a magnitude of the correction angle and a direction of the correction angle. It may be understood that the magnitude of the correction angle is equal to the magnitude of the rotation angle, and the direction of the correction angle is opposite to the direction of the rotation angle. Finally, based on the magnitude and direction of the correction angle, the correction unit corrects the projection picture.

Figure 7:
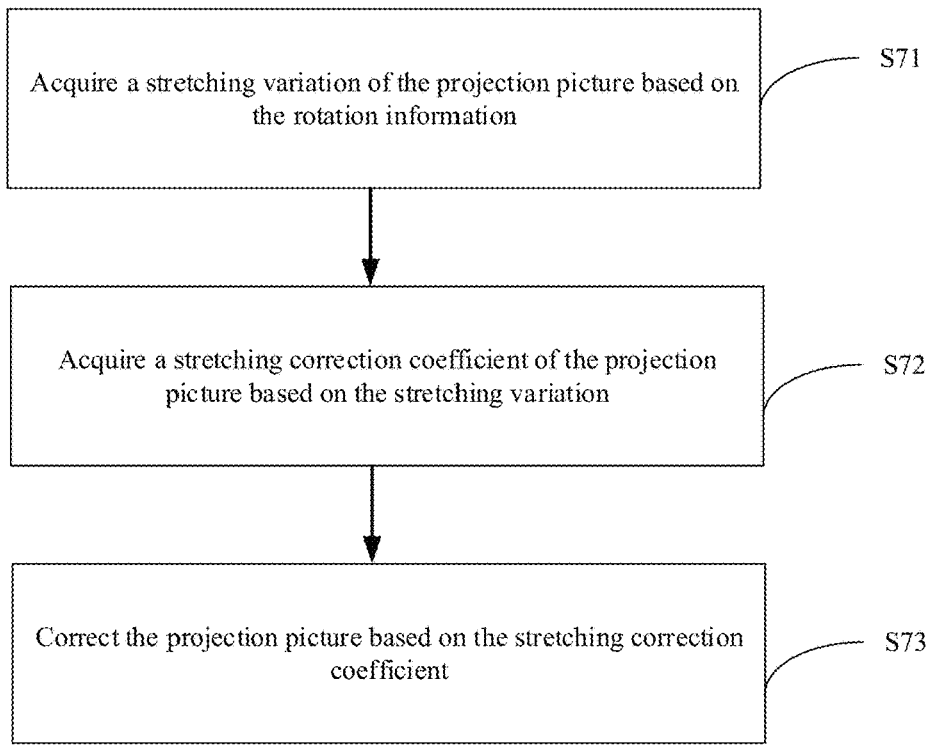
FIG. 7 is another schematic flowchart of correcting a projection picture according to an embodiment of the present disclosure.

For correction of image distortion occurred to the projection picture during rotation, in some embodiments, referring to FIG. 7, in the case that the projection picture reaches the target projection region, the method further includes the following steps.

In step S71, a stretching variation of the projection picture is acquired based on the rotation information.

In step S72, a stretching correction coefficient of the projection picture is acquired based on the stretching variation; and In step S73, the projection picture is corrected based on the stretching correction coefficient.

Specifically, based on the rotation information and the target projection region, projection picture distortion information is generated, and the stretching correction coefficient of each part of the projection picture is acquired, such that the correction unit performs stretching correction for the projection picture, and thus the projection picture is accurately projected.

Figure 8:
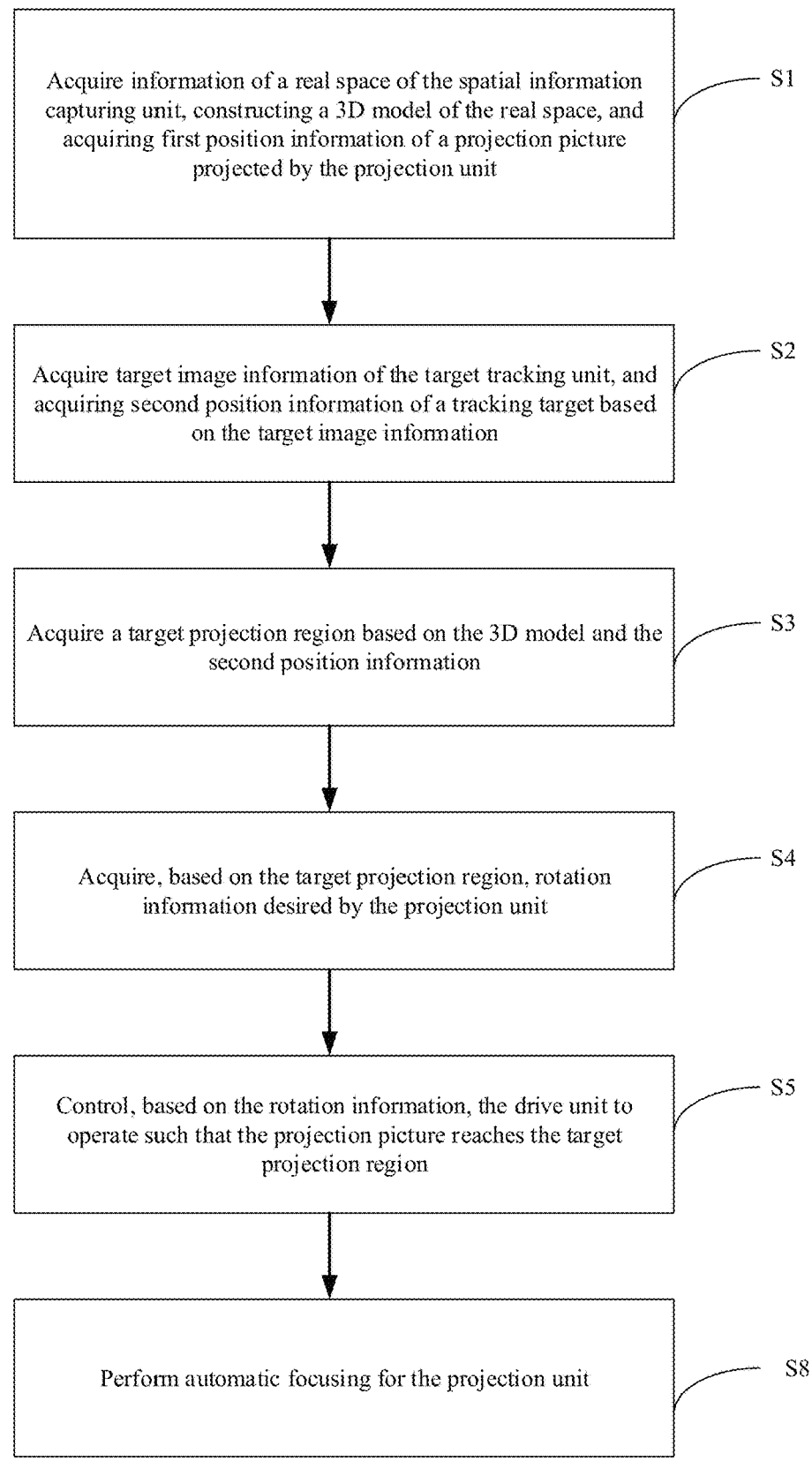
FIG. 8 is a schematic flowchart of another smart tracking-based projection method according to an embodiment of the present disclosure.

For accurate focusing of the projection picture in response to reaching the target projection region, in some embodiments, referring to FIG. 8, in the case that the projection picture reaches the target projection region, the method further includes the following steps.

In step S8, automatic focusing is performed for the projection unit.

Specifically, a corresponding relationship table may be pre-established between a projection distance and a focusing position of the projection lens. In the corresponding relationship table, each projection distance may have a unique optimal projection lens position, such that the projection picture is the clearest. Specifically, the target projection region of the projection picture is acquired, the projection distance is determined based on the target projection region, and in the case that the projection distance is acquired, the focusing position of the projection lens corresponding to the projection distance is inquired based on the corresponding relationship table, and finally, the focusing unit is controlled to move the projection lens to the focusing position to implement automatic focusing. In this way, it is ensured that the projection picture is clear.

An embodiment of the present disclosure further provides a non-volatile computer-readable storage medium. The non-volatile computer-readable storage medium stores one or more computer-executable instructions, which, when executed by one or more processors, for example, the processor 401 as illustrated in FIG. 2, cause the one or more processors to perform the smart tracking-based projection method according to any of the above method embodiments, for example, performing the steps as illustrated in FIG. 3 to FIG. 8, and implementing the functions of the apparatus as illustrated in FIG. 1.

An embodiment of the present disclosure further provides a computer program product. The computer program product includes one or more computer programs stored in a non-volatile computer-readable storage medium. The one or more computer programs include one or more program instructions, which, when executed by a computer, cause the computer to perform the smart tracking-based projection method in any of the above method embodiments, for example, performing the steps in the methods as illustrated in FIG. 3 to FIG. 8, and implementing the functions of the apparatus as illustrated in FIG. 1.

The present disclosure provides a smart tracking-based projection method, applicable to a smart tracking-based projection system. The method includes: acquiring information of a real space of a spatial information capturing unit, constructing a 3D model of the real space, and acquiring first position information of a projection picture; acquiring target image information of a target tracking unit, and acquiring second position information of a tracking target based on the target image information; acquiring a target projection region based on the 3D model and the second position information; acquiring, based on the target projection region, rotation information desired by the projection unit; and controlling, based on the rotation information, a drive unit to operate such that the projection picture reaches the target projection region. By the method, a target may be tracked, such that the projection picture reaches the target projection region, and thus motion projection is achieved.

It should be noted that the above described device embodiments are merely for illustration purpose only. The units which are described as separate components may be physically separated or may be not physically separated, and the components which are illustrated as units may be or may not be physical units, that is, the components may be located in the same position or may be distributed into a plurality of network units. Part or all of the modules may be selected according to the actual needs to achieve the objects of the technical solutions of the embodiments.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a storage medium, such as a ROM/RAM, a magnetic disk, or a CD-ROM, including several instructions for causing a computer device (a personal computer, a server, or a network device) to perform the methods according to the various embodiments of the present disclosure, or certain portions of the embodiments.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A smart tracking-based projection method, applicable to a smart tracking-based projection system, the smart tracking-based projection system comprising a spatial information capturing unit, a target tracking unit, a projection unit, and a drive unit; wherein the method comprises:
    acquiring information of a real space of the spatial information capturing unit, constructing a 3D model of the real space, and acquiring first position information of a projection picture projected by the projection unit;
    acquiring target image information of the target tracking unit, and acquiring second position information of a tracking target based on the target image information;
    acquiring a target projection region based on the 3D model and the second position information;
    acquiring, based on the target projection region, rotation information desired by the projection unit; and
    controlling, based on the rotation information, the drive unit to operate such that the projection picture reaches the target projection region;
    the method further comprising:
    acquiring a stretching variation of the projection picture based on the rotation information;
    acquiring a stretching correction coefficient of the projection picture based on the stretching variation; and
    correcting the projection picture based on the stretching correction coefficient.

2. The method according to claim 1, wherein acquiring the target projection region based on the 3D model and the second position information comprises:
    determining at least one projectable region in the 3D model based on the second position information;
    grading the at least one projectable region based on the an area of the at least one projectable region and a projection area desired by the projection picture to acquire different grades of projectable regions;
    acquiring an optimal projectable region based on the different grades of projectable regions; and
    determining the optimal projectable region as the target projection region.

3. The method according to claim 1, wherein acquiring, based on the target projection region, the rotation information desired by the projection unit comprises:
    determining at least one rotation path of the projection picture based on the target projection region and the first position information;
    grading the at least one rotation path based on a length of the rotation path and a number of unprojectable regions on the rotation path to acquire different grades of rotation paths;
    acquiring an optimal rotation path based on the different grades of rotation paths; and
    acquiring, based on the optimal rotation path, rotation information corresponding to the optimal rotation path.

4. The method according to claim 3, wherein the rotation information is a rotation angle of the projection unit.

5. The method according to claim 1, further comprising:
    acquiring an angle variation of the projection picture based on the rotation information;
    acquiring a correction angle of the projection picture based on the angle variation; and
    correcting the projection picture based on the correction angle.

6. The method according to claim 1, further comprising: performing automatic focusing for the projection unit.

7. A smart tracking-based projection system, comprising:
    a spatial information capturing unit, configured to capture information of a real space;
    a target tracking unit, configured to acquire target information of a tracking target;
    a projection unit, configured to acquire a projection picture by projection;
    a drive unit, connected to the projection unit and configured to drive the projection unit to rotate; and
    a control unit, connected to the spatial information capturing unit, the target tracking unit, the projection unit, and the drive unit; wherein the control unit comprises:
    at least one processor; and
    a memory communicably connected to the at least one processor; wherein the memory stores one or more instructions executable by the at least one processor, wherein the one or more instructions, when executed by the at least one processor, cause the at least one processor to perform the smart tracking-based projection method as defined in claim 1.

8. The system according to claim 7, wherein the drive unit comprises at least two stepping motors.

9. A non-transitory computer-readable storage medium storing one or more computer-executable instructions, wherein the one or more computer-executable instructions, when executed by a processor, cause the processor to perform the smart tracking-based projection method as defined in claim 1.

10. A computer program product, comprising one or more computer programs stored in a non-transitory computer-readable storage medium, wherein the one or more computer programs comprise one or more program instructions, which, when executed by an electronic device, cause the electronic device to perform the smart tracking-based projection method as defined in claim 1.

* * * * *